United States Patent [19]

Luka

[11] Patent Number: 4,543,717
[45] Date of Patent: Oct. 1, 1985

[54] CABLE STRIPPER

[75] Inventor: Robert E. Luka, Vancouver, Wash.

[73] Assignee: Tektronix, Inc., Beaverton, Oreg.

[21] Appl. No.: 562,377

[22] Filed: Dec. 16, 1983

[51] Int. Cl.⁴ .............................................. H02G 1/12
[52] U.S. Cl. ..................................... 30/90.6; 81/9.51; 30/90.1
[58] Field of Search ............................ 81/9.5 R, 9.51; 30/90.1, 90.6, 90.7

[56] References Cited

U.S. PATENT DOCUMENTS

| | | | |
|---|---|---|---|
| 1,165,176 | 12/1915 | Hornor | 30/90.6 |
| 3,169,315 | 2/1965 | Mankovitz | 30/90.6 |
| 4,426,778 | 1/1984 | Christie | 30/90.1 |

FOREIGN PATENT DOCUMENTS 792605 4/1958 United Kingdom ................ 30/90.7

Primary Examiner—Roscoe V. Parker
Attorney, Agent, or Firm—John D. Winkelman; John Smith-Hill

[57] ABSTRACT

A cable stripper for stripping the protective jacket from the end of a cable. A cable holder secures the cable while a blade, protruding through the guide surface of a blade holder, is urged against the cable and rotated around the cable. The guide surface of the blade holder is continuously biased against the cable surface with the blade protruding to a pre-set depth from the guide surface whereby a consistent depth of cut is achieved.

5 Claims, 5 Drawing Figures

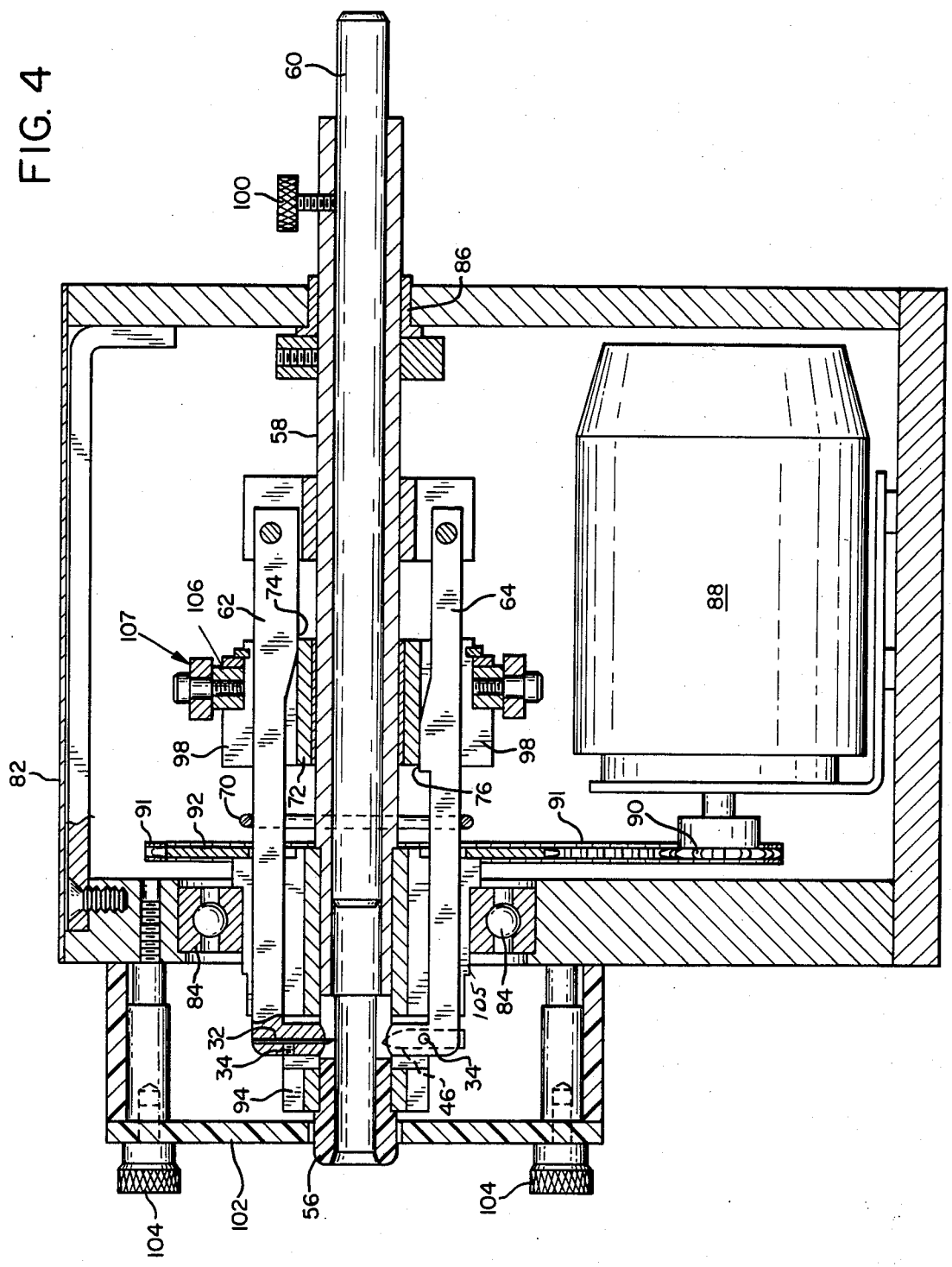

CABLE STRIPPER

FIELD OF INVENTION

This invention relates to stripping machines including adjustable stripping tools that are capable of discriminately stripping end portions of the protective jacket surrounding a cable.

BACKGROUND OF INVENTION

A cable, as the term is used herein, comprises a bundle of electrically conductive wires wrapped inside a protective jacket of rubber or plastic. Such a cable is employed where, for example, a number of electrical connections need to be made between a power source and various electronics. A single large cable running from the power source to the electronics is far easier to handle than a number of small independent wires. Also, the jacket helps protect the wires against inadvertent breakage, etc.

It will be understood that such cables are produced in very long lengths. The long cable lengths are cut into the desired shorter lengths and a portion of the ends of the short lengths have the jacket removed so as to expose the individual conductor ends to enable connection.

Particularly in an automated assembly line type operation where lengths of cable are connected by the hundreds of thousands to the electronics as being assembled, the tedious manual removal of the end portions of the jackets is time consuming, subject to diverse inaccuracies and accordingly undesireable.

The process used for stripping the jacket end is quite basic. The jacket is scored by cutting around the cable circumference and then the jacket is slit from the circular cut to the end. If properly scored, the jacket end can be readily stripped or peeled away from the cable.

The problem encountered with this process concerns the need to rapidly remove these jacket ends while taking care to avoid cutting through the jacket and into the conductive wires. If a cut is made that severs or nicks the insulation of a wire, an electrical short may result and substantial damage can be caused to the electronics to which the cable is connected.

A number of attempts have been made to develop an automated tool or machine that will accomplish the desired control for scoring the jacket to enable stripping. Commonly, such a tool includes a blade holder that follows generally a circular or linear path depending on whether the cut is being made around the cable or along its length. Such tools are acceptable for cable strips that are truly circular or linear in configuration. However, many, if not most, cables are not truly round and the jackets outer configuration undulates through peaks and valleys. The blade, which cuts to a specific depth from the path of the blade holder, will accordingly cut too shallow as the tool holder passes over the valleys or if set to accommodate the valleys, too deep as the tool holder passes over the peaks. Such tools have been found generally unsatisfactory for automated stripping of cables.

BRIEF DESCRIPTION OF INVENTION

The product of the present invention sucessfully achieves controlled circular and linear scoring of the cable jacket. A cutting tool is provided that has a cutting blade that protrudes from a blade holder a distance less than the thickness of the jacket. The blade holder is designed to follow the peaks and valleys of the cable surface. A control mechanism urges continuous contact of the blade holder against the cable surface as the blade holder encircles the cable. A second blade holder, similarly designed, scores the cable jacket lengthwise.

DETAILED DESCRIPTION AND DRAWINGS

The invention will be more fully understood and appreciated by reference to the following detailed description and drawings wherein:

FIG. 4 is a cross sectional view of a machine employing the cutting tools and mechanism schematically illustrated in FIGS. 1, 2 and 3.

Figure 1:
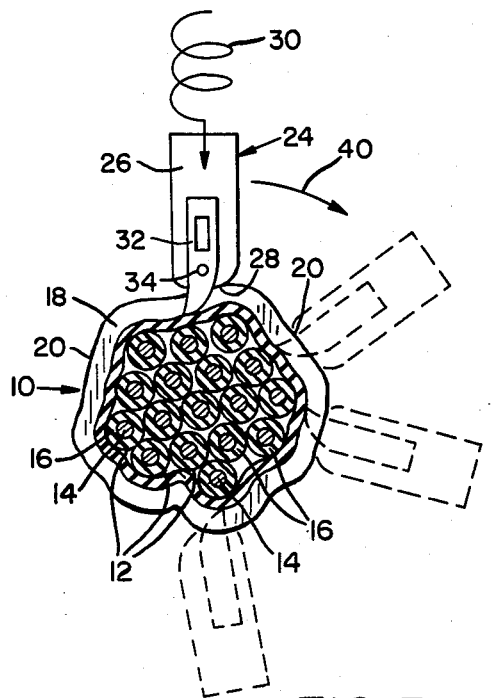
FIG. 1 is a schematic illustration of a cross section of a cable and a cutting tool of the present invention shown scoring the circumference of a cable jacket.

Referring to FIG. 1 of the drawings, a cable 10 includes a bundle of conductive wires 12 which includes conductors 14 encased in an insulation wrapping 16. Surrounding the bundle of conductive wires 12 is a protective jacket 18.

The cable diameter can vary and the embodiment of the invention contemplated herein can accommodate sizes ranging from three sixteenths inch (0.48 cm) diameter to five eights inch (1.59 cm) diameter. Similarly, the number of wires 12 within a bundle and their sizes can vary. A typical bundle includes numerous wires ranging from one thirty second inch (0.08 cm) diameter to one eighth inch (0.32 cm) diameter. The bundle is formed by tightly twisting and wrapping the wires together and the jacket is then applied to the bundle in an extrusion process. Through this process, the jacket 18 is formed with a generally constant thickness and is molded to the configuration of the perimeter of the bundle. Thus the outer surface 20 of the jacket 18 is undulated to form successive peaks and valleys due to the twisted configuration of the bundle, both circumferentially and lengthwise as illustrated in FIGS. 1 and 2.

A cutting tool 24 includes a blade holder 26 that has a convexly curved guide surface 28 that is abutted against the surface 20 of the cable jacket 18. As schematically illustrated, a biasing means 30 urges contact of the guide surface 28 against the jacket surface. A blade 32 is adjustably mounted to the blade holder by a screw 34 which makes contact against the blade. The protrusion of the blade 32 past the guide surface 28 of the blade holder is preferably adjusted to a distance of about 75% of the thickness of the jacket 18. This is accomplished by loosening screw 34 and moving the blade up or down with the use of a setup tool designed for that purpose.

With the blade tip set at 75% of the jacket thickness, the blade holder is pressed against the jacket surface as it circles around the cable circumference as indicated by arrow 40. The convex guide surface 28 of the blade holder 26 follows the contour of the jacket surface as illustrated by the various positions of the blade holder shown in dash lines. The result is that the jacket is scored to a depth that is 75% of the jacket thickness. (The unsevered portion of the jacket is illustrated by section lines in FIG. 1.)

Figure 2:
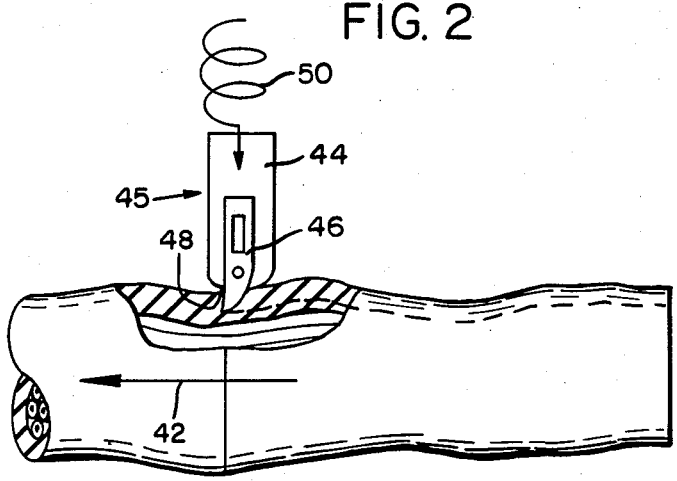
FIG. 2 is a schematic illustration of a length of cable and a cutting tool of the present invention scoring the cable jacket lengthwise.
Figure 5:
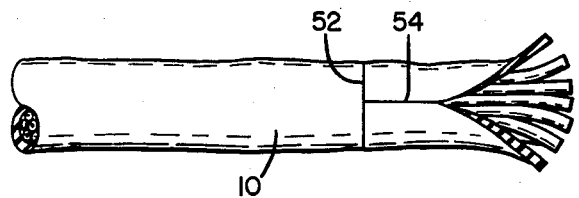
FIG. 5 is a view of a cable length having an end portion of a cable jacket scored in accordance with the present invention and illustrating the end portion being peeled away from the cable.

FIG. 2 illustrates a blade holder 44 and blace 46 of a cutting tool 45 that is oriented to travel lengthwise on the cable 10 as indicated by arrow 42. The guide surface 48 of the blade holder 44 is urged against the cable surface 50. The two cutting tools 24 and 45 are similar and perform in a similar manner to score the jacket as shown in FIG. 5 with tool 24 making the cut 52 and tool 45 making the cut 54 to thereby permit easy peeling of the jacket from the cable end.

Figure 3:
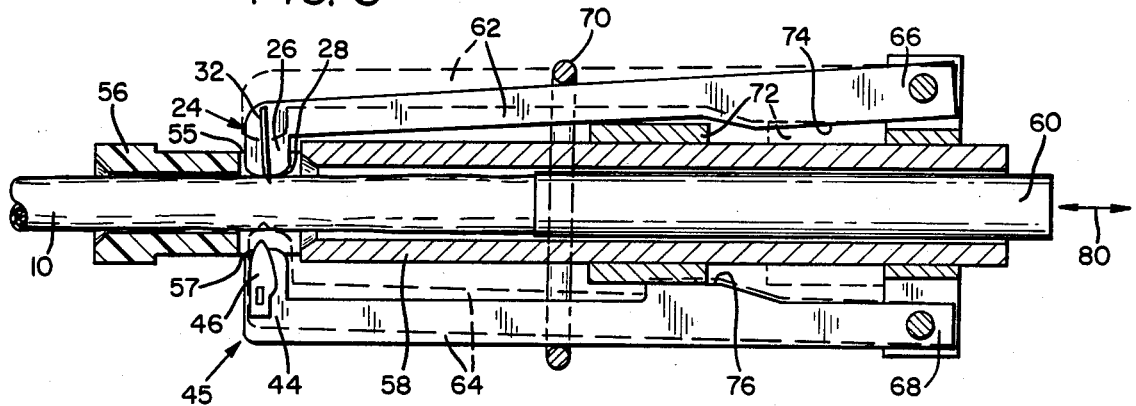
FIG. 3 is a schematic illustration of a mechanism employing the cutting tools of FIGS. 1 and 2 for scoring a cable jacket.

Reference is now made to FIG. 3 wherein the mechanism for supporting the cable and operating the cutting tools 24 and 45 is illustrated. The cable 10 is inserted through a bushing 56 and into a tubular sleeve 58 where it is abutted against a rod 60. The rod 60 is adjustably set within the sleeve to establish a desired end length of the cable from which the jacket 18 is to be stripped. The blade holders 26 and 44 are carried by arm members 62 and 64 that are pivotally connected to the sleeve 58 at their ends 66 and 68 opposite to the blade holders 26 and 44. An elastic O ring 70 urges the arm members 62 and 64 inwardly toward the sleeve 58 and cable 10 contained therein. A movable spacer ring 72 is positioned around the sleeve 58 for selectively restricting the inward positioning of arm members 62 and 64 as will now be explained.

Arm members 62 and 64 have cam surfaces 74 and 76 that are adapted to engage the spacer ring 72 depending on which of these positions the spacer ring 72 is set at. In its forward position as shown in solid lines in FIG. 3, spacer ring 72 is disengaged from cam surface 74 but engages cam surface 76. Blade 46 carried by arm member 64 is thus held away from the cable 10. However, arm member 62 is urged unrestricted toward the cable 10 and blade 32 (oriented to cut in a circular path) engages the jacket 18 of the cable 10. This engagement is accomplished by the blade holder and blade passing through a slot 55 in the bushing 56.

In this position the entire assembly including tubular sleeve 58 and arm members 62 and 64, are rotated while the cable 10 is manually held against rotation. Following several rotations of the assembly, the blade 32 will have sliced through the jacket to the desired depth. The guide surface 28 limits penetration as determined by a setting of the distance of the blade tip beyond the guide surface 28. O ring 70 continuously urges the blade holder toward the cable and thus the guide surface moves up and down the surface undulations of the cable to maintain a constant depth of penetration.

In the second position of the spacer ring 72 (refer to FIG. 4 wherein this second position is illustrated) both cam surfaces 74 and 76 of arm members 62 and 64 are engaged by the spacer ring 72 and both blade holders and blades are held away from the cable in a non-operating position. In the third position of the spacer ring 72 (the position illustrated by dash lines in FIG. 3) cam surface 74 is still engaged by the spacer ring 72 while cam surface 76 is disengaged therefrom. The blade 46 (oriented to cut lengthwise) is thus projected through slot 57 in bushing 56 and into engagement with jacket 18. In this position (and with the assembly held in a non-rotating condition) the cable 10 is withdrawn from the assembly which produces lengthwise scoring of the cable jacket. Again the blade holder 44 is continuously urged against the cable to follow the surface undulations and maintain a consistent depth of cutting blade penetration.

It is desireable for the cable bushing 56 to snuggly encircle the cable. This is accomplished by the bushing 56 being extended to the entry of sleeve 58 with the bushing slotted to accommodate entry of the blade holders 26 and 44 and engagement of the cable held by the bushing. The bushing 56 thus snuggly holds the cable at the point of blade penetration.

Reference is now made to FIG. 4 which illustrates a machine that incorporates the features heretofore described. A housing 82 surrounds the assembly comprised of a hub 105, the tubular sleeve 58 mounted to the hub and arm members 62 and 64 mounted to the sleeve. This assembly is rotatably mounted in a housing by the front bearing member 84 on the periphery of hub 105 and a rear bearing member 86 on the rearward end of the sleeve 58. Rotation of the assembly is produced by motor 88 which drives pully 90 connected by a drive belt 91 is pully 92 that is fixed to the assembly.

The cable bushing 56 is changeable to accommodate different sizes of cable. The bushing is slideably received in a bracket 94 that is connected to the hub 105 and the tubular sleeve 58. A locking screw (not shown) secures the cable bushing 56 to the bracket 94.

The spacer ring 72 is part of a slotted bracket 98 that is selectively positioned between the three positions by air cylinders through means of a bearing ring 106 and actuating assembly 107. The air cylinders and the interconnecting mechanism for positioning bracket 98 is omitted for clarification purposes. Such use of air cylinders is well known and further explanation and illustration is not necessary.

OPERATION OF THE MACHINE

The operator of the machine first sets up the machine for the particular cable to be stripped. The appropriate cable bushing 56 is selected which, as previously discussed, should snuggly fit the cable that is to be stripped. Next the blades 32 and 46 are adjusted to the desired depth of cut. This is accomplished by first loosening screws 104 and removing the safety shield 102. This exposes the screws 34 that hold the blades to the blade holders which are then loosened. A set-up tool may be used to determine the desired setting and the screws 34 are retightened. Next the rod 60 is inserted to the desired depth in the sleeve 58 and the locking screw 100 is tightened. The machine is then ready for operation.

Preferably a switch activates a timing mechanism which in turn controls the sequence of the machines functions. Thus, with the cable end inserted through the cable holder 56 and abutted against the rod 60 in the sleeve 58, the operator maintains his grip on the cable 10 and simply activates the switch.

The spacer ring is in the center position with the machine turned off whereby both arms 62 and 64 are retracted and the cable can be inserted through the cable holder 56 and sleeve 58 without interference of the blades. Upon activation of the switch, the spacer ring 72 is positioned forward to permit the blade 32 to engage the cable jacket. At the same time, motor 88 is activated to drive the pully 90 which in turn through pully 92, rotates the assembly including sleeve 58 and arm member 62 and 64.

The rotation of the assembly continues only for about 2–4 seconds generating e.g., a half dozen revolutions, which is adequate to completely score the circumference to the desired depth. Upon completion of this time segment, motor 88 is stopped and the air cylinders are activated to position the spacer ring 72 to its rearward position where arm member 62 is engaged and arm member 64 is disengaged from the ring. The blade 46 thus engages the jacket 18 and a signal is conveyed to the operator to withdraw the cable which produces the linear stripping. Upon a timed interval, the spacer ring 72 is repositioned to its center position and the machine is ready to be recycled.

The end portion of the removed cable is simply stripped off by the operator as illustrated in FIG. 5 and the operation is completed.

It will be understood that the embodiment of the invention herein described lends itself to many variations and modifications. It is to be understood that this embodiment is a preferred embodiment only and that the full scope of the invention is determined by reference to the claims appended hereto.

I claim:

1. An automatic cable stripper comprising, a tubular sleeve for receiving a cable end, an arm member pivotally mounted on one end thereof to the tubular sleeve, a blade holder on the other end of the arm member, said blade holder having a guide surface, and a blade in said blade holder protruding from said guide surface adapted to be pivoted against a cable within the tubular sleeve, biasing means for biasing the arm member toward the sleeve and the blade and bladed holder against a cable within the sleeve, and a spacer ring for selectively engaging the arm member for spacing the arm member away from the tubular sleeve and the blade and blade holder away from the cable within the sleeve, and rotating means for rotating the blade, blade holder and tubular sleeve to effect relative rotation of the blade around the cable with the guide surface of the blade holder biased against the cable whereby the protruding blade circumferentially scores the cable jacket.

2. An automatic cable stripper as defined in claim 1 including; a changeable cable bushing mounted to the sleeve and adjacent to the blade holder for securely holding a cable to be scored.

3. A cable stripper as defined in claim 2 including; a second arm member pivotally mounted at one end thereof to the tubular sleeve, a second blade holder having a guide surface and second blade protruding from the guide surface, said second blade holder mounted at the other end of the second arm member adapted to be pivoted against a cable within the tubular sleeve, said second blade oriented for lengthwise cutting of a cable within the tubular sleeve, biasing means urging pivoting of the second blade toward the cable, and said spacer means selectively engaging the second arm member for spacing the second arm member away from the tubular sleeve and the blade and blade holder carried thereby away from the cable within the sleeve, and control means controlling the spacer means to selectively permit circumferential scoring by the first blade and lengthwise scoring by the second blade.

4. An automatic cable stripper as defined in claim 3 wherein; the protrusion of the blades are adjustable relative to the blade holder, and further including a length setting rod adjustably mounted in the tubular sleeve to limit entry of a cable therein and to thereby establish the length of the cable end to be stripped.

5. An automatic cable stripper comprising; a housing, a tubular sleeve for receiving a cable end rotatably mounting in the housing, first and second arm members pivotally mounted on the tubular sleeve, blade holders on each of the arm members, blades adjustably carried by the blade holders adapted to be pivoted toward a cable within the tubular sleeve, one of said blades being oriented for circumferential scoring of the cable jacket and the other blade oriented for lengthwise scoring of the cable jacket, biasing means biasing the arm members toward a cable within the tubular sleeve, spacer means for selectively spacing the arm members to selectively prevent engagement of the blades with a cable in the tubular sleeve, drive means to rotatably drive the tubular sleeve and arm members, and control means for controlling the drive means and spacer means to effect circumferential scoring of the cable jacket with the drive means rotatably driving the tubular sleeve and to effect lengthwise scoring of the cable jacket upon withdrawal of the cable from the tubular sleeve.

* * * * *